(12) United States Patent
Ko et al.

(10) Patent No.: US 7,436,574 B2
(45) Date of Patent: Oct. 14, 2008

(54) FREQUENCY TUNABLE RESONANT SCANNER

(75) Inventors: Young-chul Ko, Gyeonggi-do (KR); Jin-ho Lee, Gyeonggi-do (KR); Ju-hyun Lee, Seoul (KR); Yong-kweun Mun, Gyeonggi-do (KR)

(73) Assignee: Samsung Electronics Co., Ltd., Suwon-Si, Gyeonggi-Do (KR)

( * ) Notice: Subject to any disclaimer, the term of this patent is extended or adjusted under 35 U.S.C. 154(b) by 0 days.

(21) Appl. No.: 11/806,946

(22) Filed: Jun. 5, 2007

(65) Prior Publication Data

US 2007/0236767 A1    Oct. 11, 2007

Related U.S. Application Data

(62) Division of application No. 10/963,693, filed on Oct. 14, 2004, now Pat. No. 7,242,511.

(30) Foreign Application Priority Data

Oct. 24, 2003 (KR) ...................... 10-2003-0074662

(51) Int. Cl.
*G02B 26/00* (2006.01)
*G02B 26/08* (2006.01)

(52) U.S. Cl. ................ 359/291; 359/225; 359/295

(58) Field of Classification Search .......... 359/198, 359/224, 225, 254, 290–292, 295, 298; 310/309
See application file for complete search history.

(56) References Cited

U.S. PATENT DOCUMENTS

| 5,914,553 | A | 6/1999 | Adams et al. |
| 5,959,760 | A | 9/1999 | Yamada et al. |
| 6,535,325 | B2 | 3/2003 | Helsel et al. |
| 7,034,370 | B2 | 4/2006 | Kuo |
| 2001/0033410 | A1 | 10/2001 | Helsel et al. |
| 2003/0039089 | A1 | 2/2003 | Lee et al. |
| 2004/0099739 | A1* | 5/2004 | Kuo et al. |
| 2005/0036196 | A1 | 2/2005 | Barnea et al. |

FOREIGN PATENT DOCUMENTS

| EP | 1 180 493 A2 | 2/2002 |
| EP | 1 203 976 A2 | 5/2002 |
| JP | 11-52278 | 2/1999 |
| JP | 2001-194151 | 7/2001 |
| JP | 2002-311376 | 10/2002 |
| JP | 2003-136497 | 5/2003 |

OTHER PUBLICATIONS

European Search Office Search Report.

* cited by examiner

*Primary Examiner*—William C Choi
(74) *Attorney, Agent, or Firm*—Buchanan Ingersoll & Rooney PC

(57) ABSTRACT

Provided is a one-axis driving optical scanner which includes a substrate, a stage separated from the substrate to a predetermined height and having an upper surface where an optical scanning surface is formed, a torsion spring supporting the stage from middle portions of both edge sides of the stage, a support portion fixed to the substrate to support the torsion spring, a driving portion rotating the stage with respect to the torsion spring forming a center axis, and a flat panel type tuning electrode arranged in an area of the substrate corresponding to the stage.

5 Claims, 10 Drawing Sheets

FREQUENCY TUNABLE RESONANT SCANNER

BACKGROUND OF THE INVENTION

This application claims the priority of Korean Patent Application No. 2003-74662, filed on Oct. 24, 2003, in the Korean Intellectual Property Office, the disclosure of which is incorporated herein in its entirety by reference.

1. Field of the Invention

The present invention relates to an optical scanner having an MEMS (micro electromechanical system) structure in which a frequency is tunable, and more particularly, to an optical scanner in which a resonant frequency is tunable by using a tuning electrode.

2. Description of the Related Art

Microactuators are used as scanners to deflect a laser beam in projection TVs. U.S. Patent Publication Application No. 2003-39089 discloses an example of an MEMS type scanner.

In an optical scanner disclosed in U.S. Patent Publication Application No. 2003-39089, a stage seesaws with respect to a torsion spring supporting the stage as a center shaft. As the stage is seesawing, light incident on a flat reflection mirror formed on the stage is scanned. The optical scanner deflects the stage connected to a driving electrode by applying an electrostatic force between a driving comb electrode and a fixed comb electrode.

In the MEMS type scanner, when the stage is driven in a resonant frequency range, a driving angle of the stage increases and a driving voltage is lowered. However, when an MEMS structure is accurately manufactured, it is very difficult to manufacture an actuator having a predetermined natural frequency due to a deviation in process. Also, a change in the resonant frequency may occur according to a change of surrounding environment.

U.S. Pat. No. 6,535,325 discloses a method of controlling a resonant frequency of an MEMS type optical scanner. That is, after a plurality of tuning tabs are installed at an edge portion of a stage, the tab is removed by a laser trimming or mechanical force while a frequency is measured, so that the weight of a mirror body is reduced. Thus, by increasing the frequency, the optical scanner is driven at a resonant frequency.

SUMMARY OF THE INVENTION

To solve the above and/or other problems, the present invention provides an optical scanner in which a tuning electrode is installed in an area corresponding to a stage so that a frequency of the stage can be controlled during a driving of the optical scanner.

According to an aspect of the present invention, a one-axis driving optical scanner comprises a substrate, a stage separated from the substrate to a predetermined height and having an upper surface where an optical scanning surface is formed, a torsion spring supporting the stage from middle portions of both edge sides of the stage, a support portion fixed to the substrate to support the torsion spring, a driving portion rotating the stage with respect to the torsion spring forming a center axis, and a flat panel type tuning electrode arranged in an area of the substrate corresponding to the stage.

According to another aspect of the present invention, a one-axis driving optical scanner comprises a substrate, a stage separated from the substrate to a predetermined height and having an upper surface where an optical scanning surface is formed, a torsion spring supporting the stage from middle portions of both edge sides of the stage, a support portion fixed to the substrate to support the torsion spring, a driving portion rotating the stage with respect to the torsion spring forming a center axis, and at least one driving comb electrode for tuning formed on a lower surface of the stage to a predetermined height in a direction along the center axis, and at least one fixed comb electrode for tuning formed on the substrate to a predetermined height to be alternate with the driving comb electrodes for tuning.

The driving portion comprises a plurality of driving comb electrodes extended from both side surfaces of the center axis on the lower surface of the stage to a predetermined length downward in a direction perpendicular to the center axis, and a plurality of fixed comb electrodes fixed on the substrate to be alternate with the driving comb electrodes.

The driving portion comprises a plurality of driving comb electrodes extending outwardly from both sides of the stage, and a plurality of fixed comb electrodes fixed on the substrate to be alternate with the driving comb electrodes.

According to yet another aspect of the present invention, a two-axis driving optical scanner comprises a substrate, a stage separated from the substrate to a predetermined height and driven in a first direction with respect to a center axis in a second direction perpendicular to the first direction, a first support portion including first torsion springs extending in the second direction from both sides of the stage and a rectangular motion frame having a pair of first portions parallel to each other and respectively connected to the first torsion springs and a pair of second portions parallel to each other and extending in the second direction, a stage driving portion including a plurality of first fixed comb electrodes and a plurality of first driving comb electrodes formed on inner sides of the second portions and sides of the stage facing the inner sides of the second portions, respectively, a second support portion including second torsion springs extending in the first direction from the second portions and fixing the second torsion springs to the substrate, a motion frame driving portion including a plurality of second driving comb electrodes provided at outer sides of the first portions and a plurality of second fixed comb electrodes fixed to correspond to the second driving comb electrodes to rotate the motion frame in the second direction, and a flat panel type tuning electrode arranged in the area of the substrate corresponding to the stage.

According to still yet another aspect of the present invention, a two-axis driving optical scanner comprises a substrate, a stage separated from the substrate to a predetermined height and driven in a first direction with respect to a center axis in a second direction perpendicular to the first direction, a first support portion including first torsion springs extending in the second direction from both sides of the stage and a rectangular motion frame having a pair of first portions parallel to each other and respectively connected to the first torsion springs and a pair of second portions parallel to each other and extending in the second direction, a stage driving portion including a plurality of first fixed comb electrodes and a plurality of first driving comb electrodes formed on inner sides of the second portions and sides of the stage facing the inner sides of the second portions, respectively, a second support portion including second torsion springs extending in the first direction from the second portions and fixing the second torsion springs to the substrate, a motion frame driving portion including a plurality of second driving comb electrodes provided at outer sides of the first portions and a plurality of second fixed comb electrodes fixed to correspond to the second driving comb electrodes to rotate the motion frame in the second direction, at least one driving comb electrode for tuning formed on a lower surface of the stage to a predetermined height in the second direction, and at least one fixed comb electrode for tuning formed on the substrate to a predetermined height to be alternate with the driving comb electrode for tuning.

BRIEF DESCRIPTION OF THE DRAWINGS

The above and other features and advantages of the present invention will become more apparent by describing in detail preferred embodiments thereof with reference to the attached drawings in which.

DETAILED DESCRIPTION OF THE INVENTION

Figure 1:
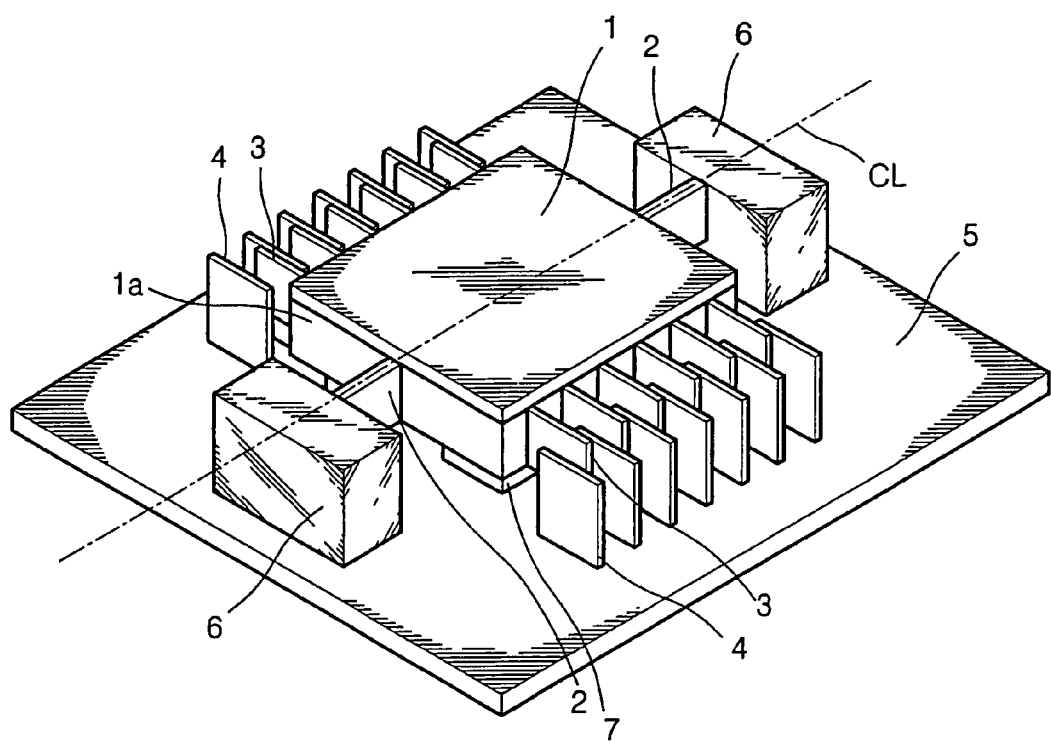
FIG. 1 is a perspective view of an optical scanner according to a first embodiment of the present invention.
Figure 2:
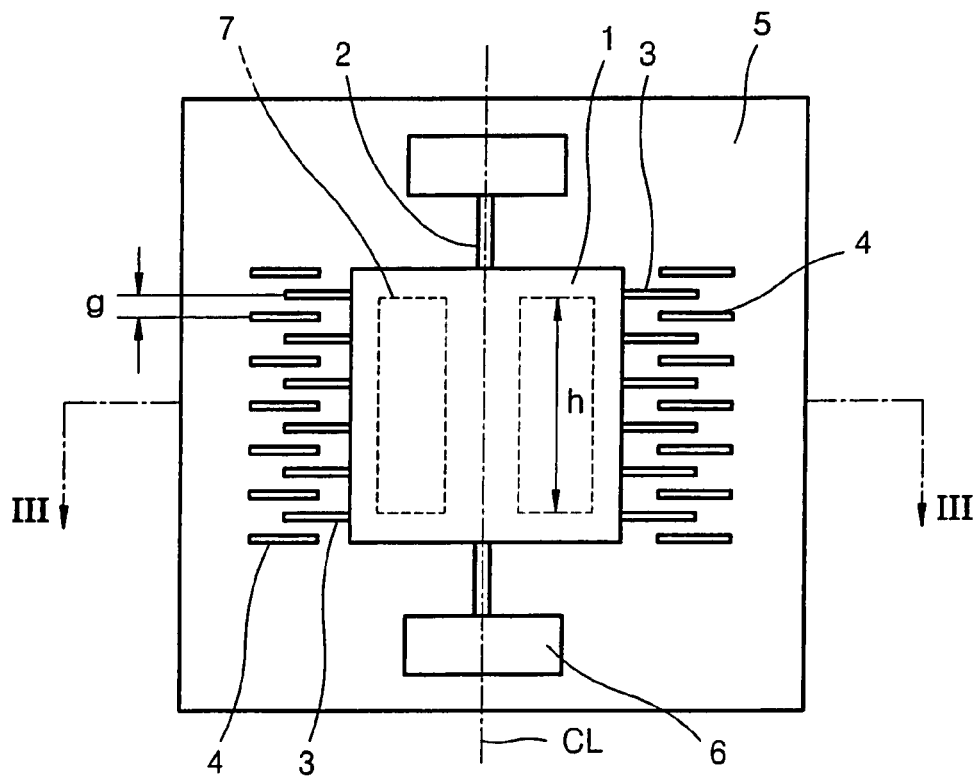
FIG. 2 is a plan view of the optical scanner of FIG. 1.
Figure 3:
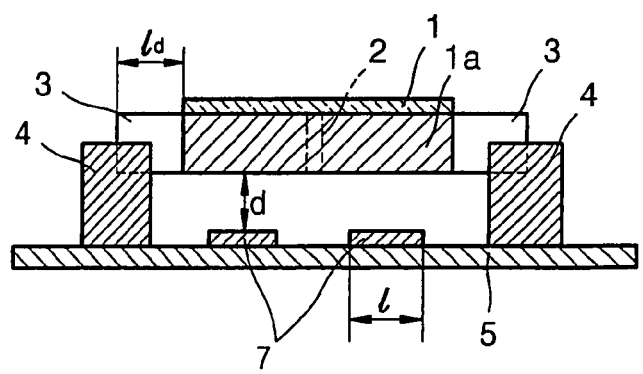
FIG. 3 is a sectional view taken along line III-III of FIG. 2.

Referring to FIGS. 1 through 4, in an optical scanner according to a first embodiment of the present invention, a stage $1a$ is suspended by a support portion supporting both side ends of the stage $1a$ above a substrate 5 made of Pyrex glass. The support portion includes a torsion spring 2 connected to a middle portion of either side edge of the stage $1a$ and supporting a seesaw motion of the stage $1a$, and an anchor 6 supporting the torsion spring 2 to be suspended on the substrate 5.

A mirror surface 1 which is an optical scanning surface is formed on an upper surface of the stage $1a$. A plurality of driving comb electrodes 3 are formed at both sides of the stage $1a$ to have a predetermined length and parallel to one another.

A plurality of fixed comb electrodes 4 disposed to alternate with the driving comb electrodes 3 are formed on an upper surface of the substrate 5 to have a predetermined height and parallel to one another. The driving comb electrodes 3 formed on a lower surface of the stage $1a$ and the fixed comb electrodes 4 corresponding thereto are dividedly arranged at both sides divided by the center line CL. A tuning electrode 7 is arranged at either side of an area corresponding to the stage $1a$ with respect to the center line CL.

Figure 4:
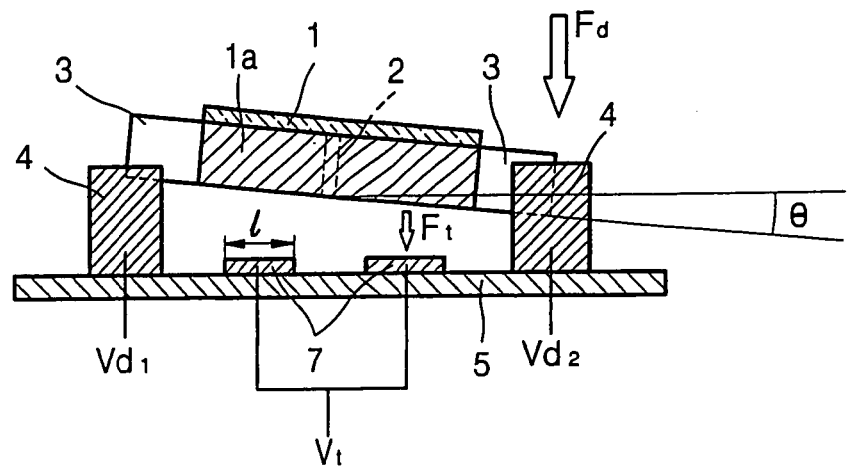
FIG. 4 is a sectional view for explaining an operation of the optical scanner of FIG. 1.

According to the above structure, the stage $1a$ performs a seesaw motion by an electrostatic force between the driving comb electrodes 3 and the fixed comb electrodes 4 are dividedly arranged at both sides with respect to the center line CL. For example, when a predetermined voltage $Vd_1$ is applied to the fixed comb electrodes 4 disposed at the left side with respect to the center line CL, an electrostatic force is generated between the driving comb electrodes 3 and the fixed comb electrodes 4 so that the driving comb electrodes 3 are driven. Thus, the stage $1a$ is moved downward at the left side. When a predetermined voltage $Vd_2$ is applied to the fixed comb electrodes 4 disposed at the right side with respect to the center line CL as shown in FIG. 4, an electrostatic force is generated between the driving comb electrodes 3 and the fixed comb electrodes 4 so that the driving comb electrodes 3 are driven. Thus, the stage $1a$ is moved downward at the right side. The stage $1a$ is returned to the original state by a restoration force according to an elastic coefficient of the torsion spring 2. The electrostatic force is alternately generated by alternately applying a driving voltage to the fixed comb electrodes 4 at the left and right sides so that a seesaw motion of the stage $1a$ is generated. In a state in which the stage $1a$ is excited at a resonant frequency, when a predetermined voltage Vt is applied to the tuning electrode 7, the resonant frequency of the stage $1a$ can be controlled.

Next, the principle of tuning the resonant frequency by applying a voltage to the tuning electrode of the optical scanner having the above structure is described below.

When a predetermined voltage Vd2 is applied to the fixed comb electrodes 4 at one side, the corresponding driving comb electrodes 3 are moved toward the fixed comb electrodes 4 by the electrostatic force and rotated around the center line CL as shown in FIG. 4. The driving force at this time is shown in Equation 1.

$$F_d = \frac{\varepsilon l_d V_d^2}{g} \quad [\text{Equation 1}]$$

Here, $\varepsilon$ is a dielectric constant, $l_d$ is a length of the driving comb electrode, and g is a gap between the driving comb electrode and the fixed comb electrode.

A rotational equation of the stage by the driving force is shown in Equation 2.

$$I\ddot{\theta} + c\dot{\theta} + k_s^m \theta = N_d \quad [\text{Equation 2}]$$

Here, I is an inertia moment of the stage, $\theta$ is a driving angle, c is a damping constant, $k_s^m$ is a torsion spring constant, and $N_d$ is an exciting torque by the driving voltage.

When a tuning voltage Vt is applied to the tuning electrode 7, a new tuning force Ft is generated which is expressed in Equation 3.

$$F_t = \varepsilon l h V_t^2 \left( \frac{1}{(d-l\theta)^2} - \frac{1}{(d+l\theta)^2} \right) \quad [\text{Equation 3}]$$

$$= \varepsilon l^2 h V_t^2 \left( \frac{4}{d^3} \right) \theta + \varepsilon l^4 h V_t^2 \left( \frac{16}{d^5} \right) \theta^3$$

Here, l and h are the lengths of both sides of the tuning electrode and d is a height of between the stage and the tuning electrode.

The rotational torque by a rotational force of the tuning voltage is shown Equation 4.

$$N_t = F_t \times r = k_t \times \theta \quad \text{[Equation 4]}$$

Here, r=l/2.

When Equation 3 where a higher degree term having a low level of significance is removed is applied instead of the tuning force $F_t$ in Equation 4, the tuning spring constant can be defined as shown in Equation 5.

$$k_t = \varepsilon l^2 h V_t^2 \left(\frac{4}{d^3}\right) \times r \quad \text{[Equation 5]}$$

An exciting torque $N_t$ by the tuning voltage is included in a motion equation of Equation 2, which is shown in Equation 6.

$$I\ddot{\theta} + c\dot{\theta} + k_s^m \theta = N_d + N_f \quad \text{[Equation 6]}$$

Equation 7 is obtained by applying Equation 4 to Equation 6.

$$I\ddot{\theta} + c\dot{\theta} + (k_s^m - k_t)\theta = N_d \quad \text{[Equation 6]}$$

Thus, when a tuning voltage is applied to the scanner to which a driving voltage is applied, an effective spring constant is shown in Equation 8.

$$k_s = k_s^m - k_t \quad \text{[Equation 8]}$$

The resonant frequency can be defined as Equation 9.

$$f_s = \frac{1}{2\pi} \sqrt{\frac{k_s^m - k_t}{I}} \quad \text{[Equation 9]}$$

Thus, when the tuning voltage $V_t$ is applied to the tuning electrode 7, the torsion spring constant of the scanner changes as shown in Equation 8. Accordingly, the frequency of the scanner changes as shown in Equation 9. The resonant frequency of the scanner can be tuned by controlling the tuning voltage.

Figure 5:
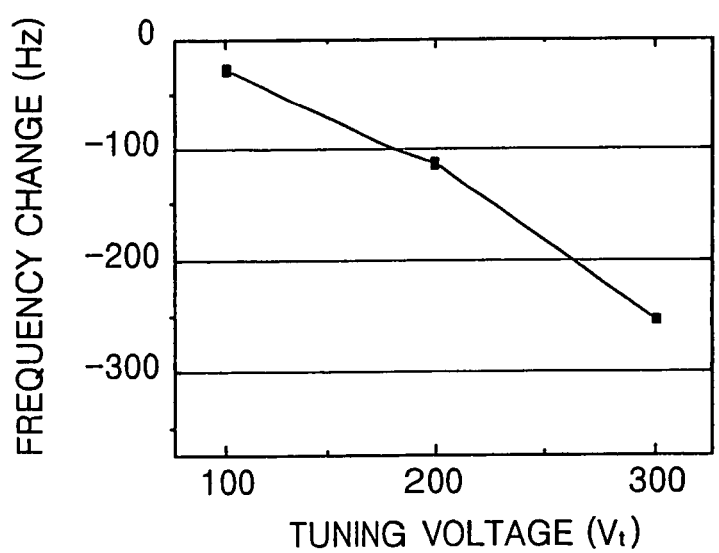
FIG. 5 is a graph showing a change in frequency when a tuning voltage applied to the tuning electrode of the optical scanner of FIG. 1 is changed.

FIG. 5 is a graph showing a change in frequency when the tuning voltage applied to the tuning electrode of the optical scanner of FIG. 1 is changed. A scanner to be used in a test has a size such that d=30 μm, a size of a mirror is 700×500 μm, a width of the comb electrode is 2 μm, ld=250 μm, and g=3 μm.

The spring constant $k_s^m$ is $1.4 \times 10^{-5}$ Nm and a driving voltage of 300 V is applied. At this time, the resonant frequency of the scanner is measured to be 33.839 kHz.

When tuning voltages 100 V, 200 V, and 300 V are applied, the effective spring constant by Equation 8 changes. Accordingly, the resonant frequency changes as shown in FIG. 5, that is, as the tuning voltage $V_t$ increases, the resonant frequency greatly decreases. A desired amount of the decrease in the resonant frequency is 89 Hz. As a result of plotting in FIG. 5, it can be seen that the desired resonant frequency decrease is obtained at the tuning voltage of 170 V.

Figure 6:
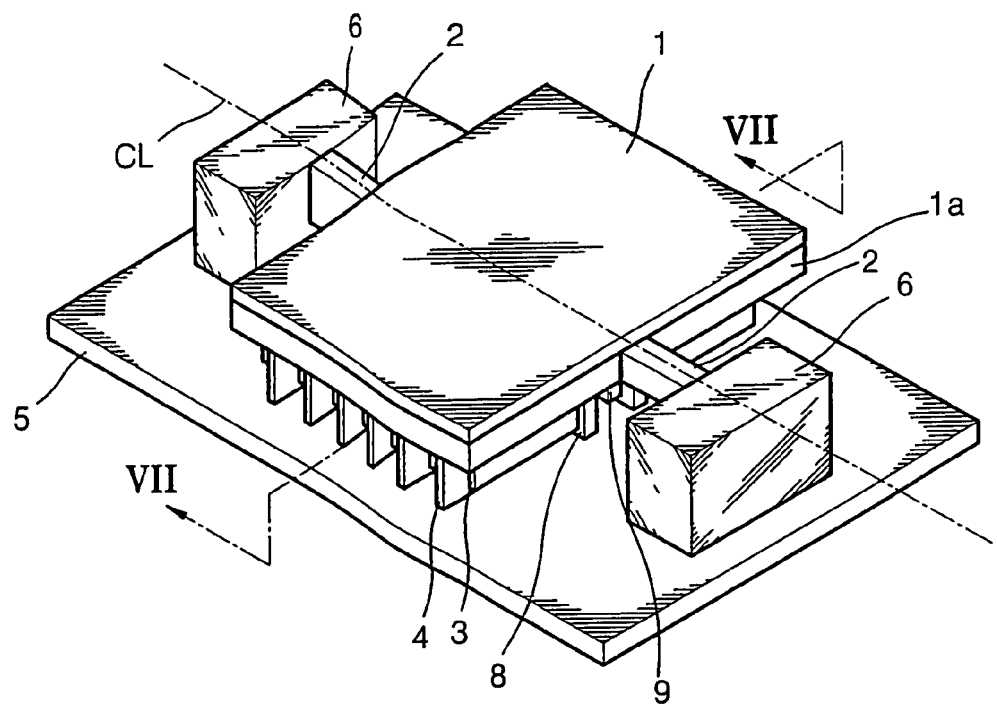
FIG. 6 is a perspective view of an optical scanner according to a second embodiment of the present invention.
Figure 7:
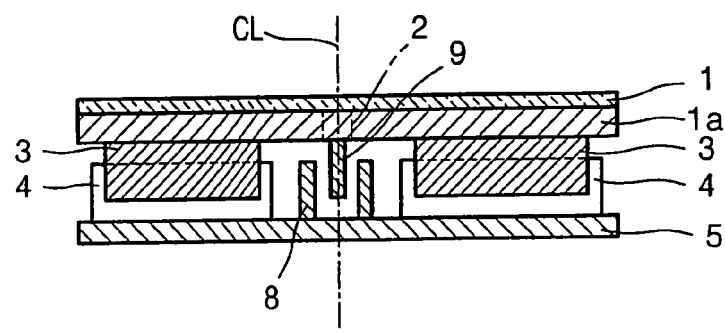
FIG. 7 is a sectional view taken along line VII-VII of FIG. 6.
Figure 8:
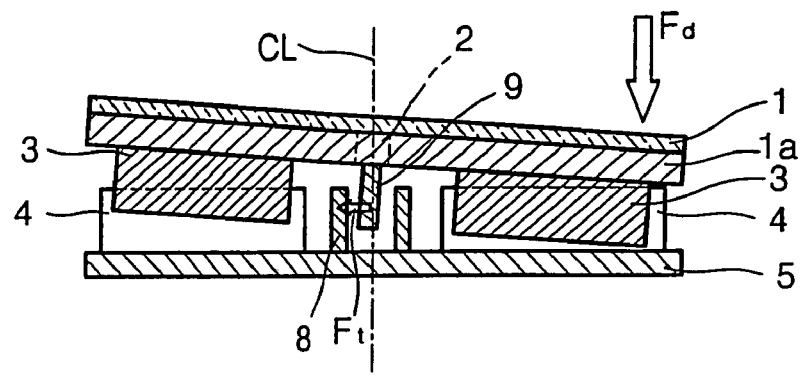
FIG. 8 is a sectional view for explaining an operation of the optical scanner of FIG. 6.

FIG. 6 is a perspective view of an optical scanner according to a second embodiment of the present invention. FIG. 7 is a sectional view taken along line VII-VII of FIG. 6. FIG. 8 is a sectional view for explaining an operation of the optical scanner of FIG. 6. The same reference numerals are used for the same constituent elements as those described in the first embodiment and detailed descriptions thereof will be omitted herein.

Referring to FIGS. 6 through 8, a plurality of the driving comb electrodes 3 are formed on the lower portion of the stage 1a to a predetermined height and parallel to one another.

The driving comb electrodes 3 are dividedly arranged at both sides of the lower portion of the stage 1a with respect to the center line CL.

A plurality of the fixed comb electrodes 4 alternating with the driving comb electrodes 3 are formed on the upper portion of the substrate 5 to a predetermined height and parallel to one another. The fixed comb electrodes 4 are dividedly arranged at both sides of the upper portion of the substrate 5 with respect to the center line CL to correspond to the driving comb electrodes 3.

A fixed comb electrode for tuning 8 is arranged at the center portion of the substrate 5 in the same direction as the center line CL. A driving comb electrode for tuning 9 is arranged on the lower portion of the stage 1a to correspond to the fixed comb electrode for tuning 8.

According to the above structure, the stage 1a performs a seesaw motion by an electrostatic force between the driving comb electrodes 3 and the fixed comb electrodes 4 disposed at both sides divided by the center line CL. When a predetermined tuning voltage is applied to the fixed comb electrode for tuning 9, a tuning force is generated between the driving comb electrode for tuning 9 and the fixed comb electrode for tuning 8. As the constant of the torsion spring 2 changes, the driving frequency decreases. Thus, the resonant frequency of the scanner can be controlled by adjusting the tuning voltage.

Figure 9:
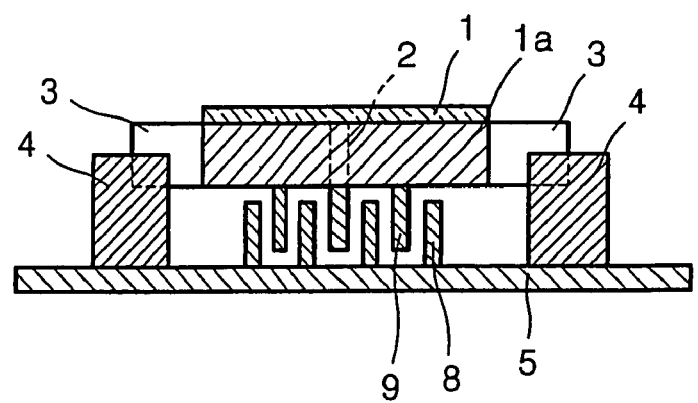
FIG. 9 is a sectional view of an optical scanner according to a third embodiment of the present invention.

FIG. 9 is a sectional view of an optical scanner according to a third embodiment of the present invention. The same reference numerals are used for the same constituent elements described in the previous embodiments and detailed descriptions thereof will be omitted herein.

Referring to FIG. 9, the structure of the scanner according to the third embodiment is similar to the scanner according to the first embodiment. However, electrodes 8 and 9 for the frequency tuning of the scanner are vertically formed on the lower portion of the stage 1a and the upper portion of the substrate 5. The driving comb electrode for tuning 9 on the lower portion of the stage 1a and the fixed comb electrode for tuning 8 on the upper portion of the substrate 5 are installed to alternate with one another. When a tuning voltage is applied to the fixed comb electrode for tuning 8 during the driving of the stage 1a, a tuning force is generated between the driving comb electrode 9 and the fixed comb electrode for tuning 8. As described above, the constant of the torsion spring 2 changes, the resonant frequency decreases. Thus, the resonant frequency of the scanner can be controlled by adjusting the tuning voltage.

Figure 10:
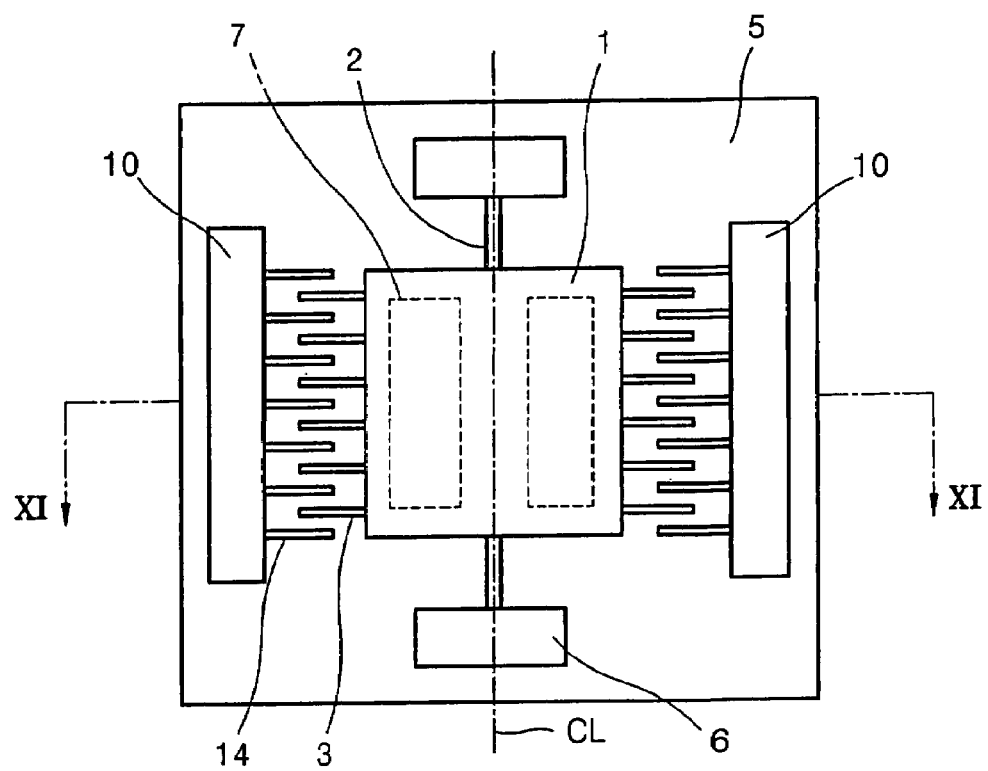
FIG. 10 is a plan view of an optical scanner according to a fourth embodiment of the present invention.
Figure 11:
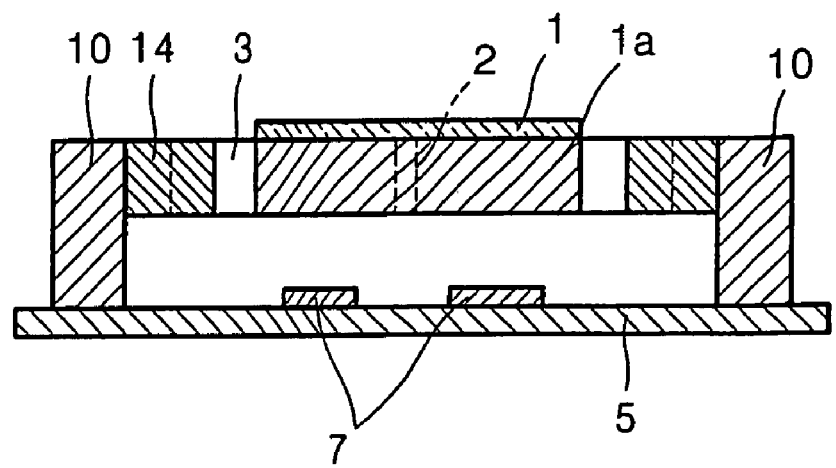
FIG. 11 a sectional view taken along line XI-XI of FIG. 10.

FIG. 10 is a plan view of an optical scanner according to a fourth embodiment of the present invention. FIG. 11 a sectional view taken along line XI-XI of FIG. 10. Since the same reference numerals are used for the same constituent elements as those of the first embodiment, detailed descriptions thereof will be omitted herein.

Referring to FIGS. 10 and 11, the structure of the scanner according to the fourth embodiment is similar to that of the scanner according to the first embodiment. However, a plurality of fixed comb electrodes 14 to drive the stage 1a are horizontally fixed to an anchor portion 10 fixed on the substrate 5.

According to the above structure, the stage 1a performs a seesaw motion by an electrostatic force between the driving comb electrodes 3 and the fixed comb electrodes 14 disposed at both sides with respect to the center line CL. For example, when a predetermined driving voltage is applied to the fixed comb electrodes 14 disposed at the left side of the center line CL, an electrostatic force is generated between the driving comb electrodes 3 and the fixed comb electrodes 14 so that the driving comb electrodes 3 are driven. Thus, the stage 1a is moved downward at the left side. When a predetermined voltage is applied to the tuning electrode 7, a torsion spring constant changes so that the resonant frequency of the stage can be controlled.

Figure 12:
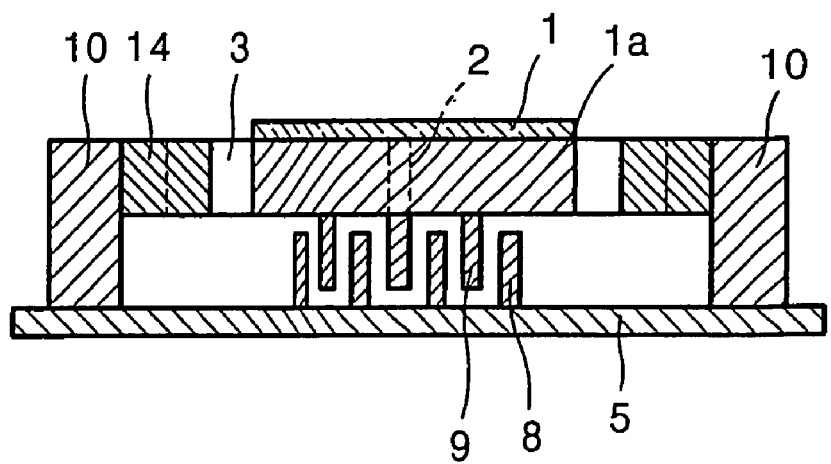
FIG. 12 is a sectional view of an optical scanner according to a fifth embodiment of the present invention.

FIG. 12 is a side sectional view of an optical scanner according to a fifth embodiment of the present invention. Since the same reference numerals are used for the same constituent elements as those of the fourth embodiment, detailed descriptions thereof will be omitted herein.

Referring to FIG. 12, in the scanner according to the fifth embodiment, the fixed comb electrodes 14 to drive the stage 1a are horizontally fixed to the anchor portion 10 fixed on the substrate 5. The electrodes for tuning the resonant frequency of the scanner are vertically formed on the lower portion of the stage 1a and the upper portion of the substrate 5. The driving comb electrodes 9 for tuning on the lower portion of the stage 1a and the fixed comb electrode for tuning 8 are installed to be alternate with one another. When a tuning voltage is applied to the fixed comb electrodes for tuning 8 during the driving of the stage 1a, a tuning force is generated between the driving comb electrodes 9 for tuning and the fixed comb electrodes for tuning 8. Accordingly, the constant of the torsion spring 2 changes so that the driving frequency decreases. Thus, the resonant frequency of the scanner can be controlled by adjusting the tuning voltage.

Figure 13:
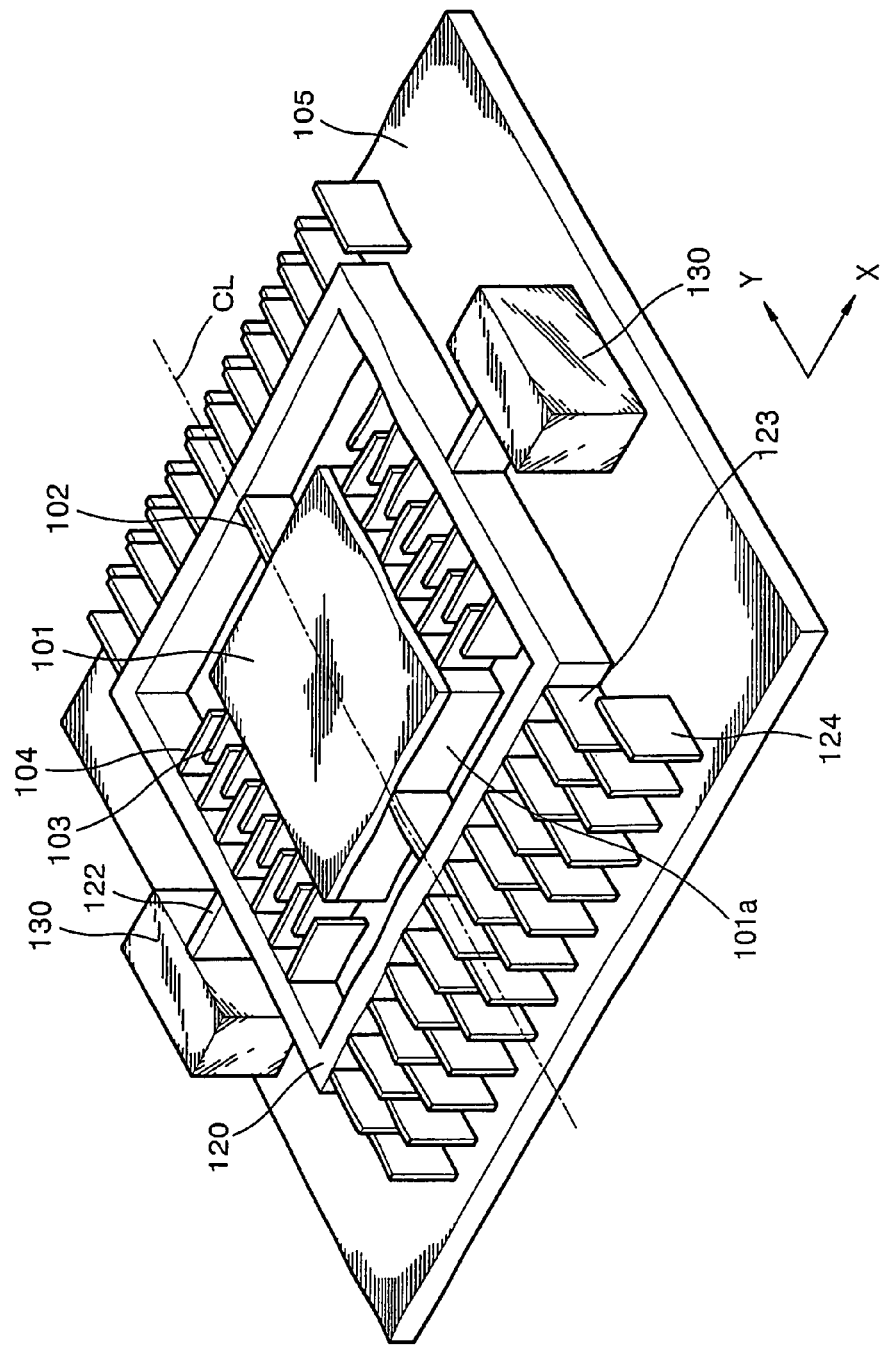
FIG. 13 is a perspective view of an optical scanner according to a sixth embodiment of the present invention.
Figure 14:
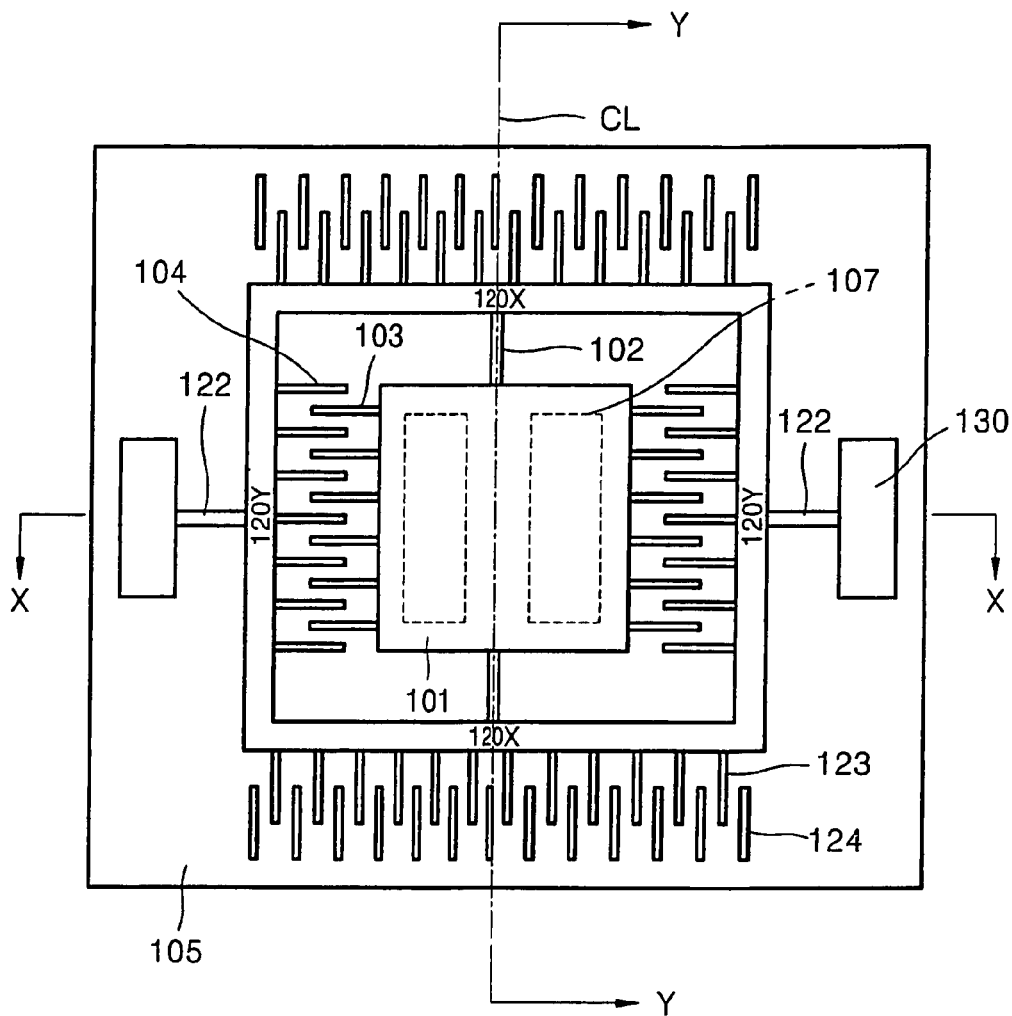
FIG. 14 is a plan view of the optical scanner of FIG. 13.
Figure 15:
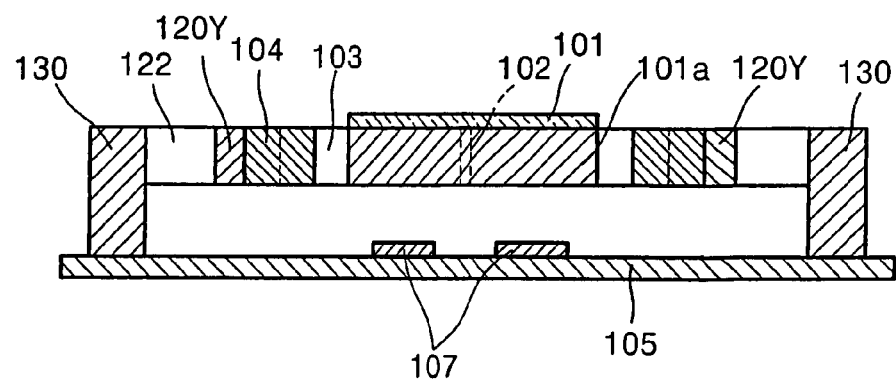
FIG. 15 is a sectional view taken along line X-X of FIG. 14.
Figure 16:
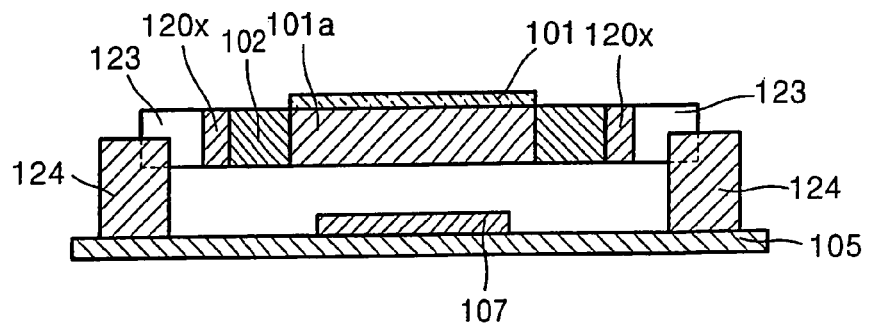
FIG. 16 is a sectional view taken along line Y-Y of FIG. 14.

FIG. 13 is a perspective view of an optical scanner according to a sixth embodiment of the present invention. FIG. 14 is a plan view of the optical scanner of FIG. 13. FIGS. 15 and 16 are sectional views taken along line X-X of FIG. 14 and line Y-Y of FIG. 14, respectively.

Referring to FIGS. 13 through 16, a stage 101a having a mirror surface 101 formed on an upper surface thereof is supported by a first support portion including a first torsion spring 102 and a rectangular motion frame 120, so as to be able to perform a seesaw motion in a first direction (a direction X) with respect to a center line CL as a center shaft. The first support portion supporting the stage 101a is supported by a second support portion including a second torsion spring 122 and a fixed anchor 130, so as to be able to perform a seesaw motion in a second direction (a direction Y). Thus, the stage 1a supported by the first and second support portions can rotate in two axial directions.

The rectangular motion frame 120 has a first portion 120X extending parallel to an axis X, in which the first torsion spring 102 is connected in the middle thereof, and a second portion 120Y extending parallel to an axis Y, in which the second torsion spring 122 is connected in the middle thereof.

The stage 101a is supported and connected to the rectangular motion frame 120 by the first torsion spring 102 disposed on the axis Y. The torsion spring 102 is connected to the middle portion of the opposite edges of the stage 101a.

A plurality of first driving comb electrodes 103 are formed at both sides of the stage 101a. A plurality of first fixed comb electrodes 104 arranged to be alternate with the first driving comb electrodes 103 are formed on the second portion 120Y to be inside the frame 120 and correspond to the first driving comb electrodes 103. The driving comb electrodes 103 and the fixed comb electrodes 104 which are symmetrically arranged at both side with respect to the torsion spring 102 form a stage driving portion.

A motion frame driving portion to seesaw the stage 101a and the motion frame 120 supporting the stage 101a in the direction Y has a plurality of second driving comb electrodes 123 formed outwardly on both sides of the motion frame 120 and a plurality of second fixed comb electrodes 124 disposed to be alternate with the driving comb electrodes 123 and fixed on an upper surface of the substrate 105.

A tuning electrode 107 having a flat panel shape is formed at both sides divided by a line Y-Y in an area of the substrate 105 corresponding to the stage 101a. In the above two-axis driving scanner, when the stage 101a rotates in the first direction (the direction x) by an electrostatic force between the first driving comb electrode 103 and the first fixed comb electrode 104, the resonant frequency is tunable by the tuning electrode 107. Meanwhile, the stage 101a is linearly driven in the second direction (the direction Y) by an electrostatic force between the second driving comb electrode 123 and the second fixed comb electrode 124.

Figure 17:
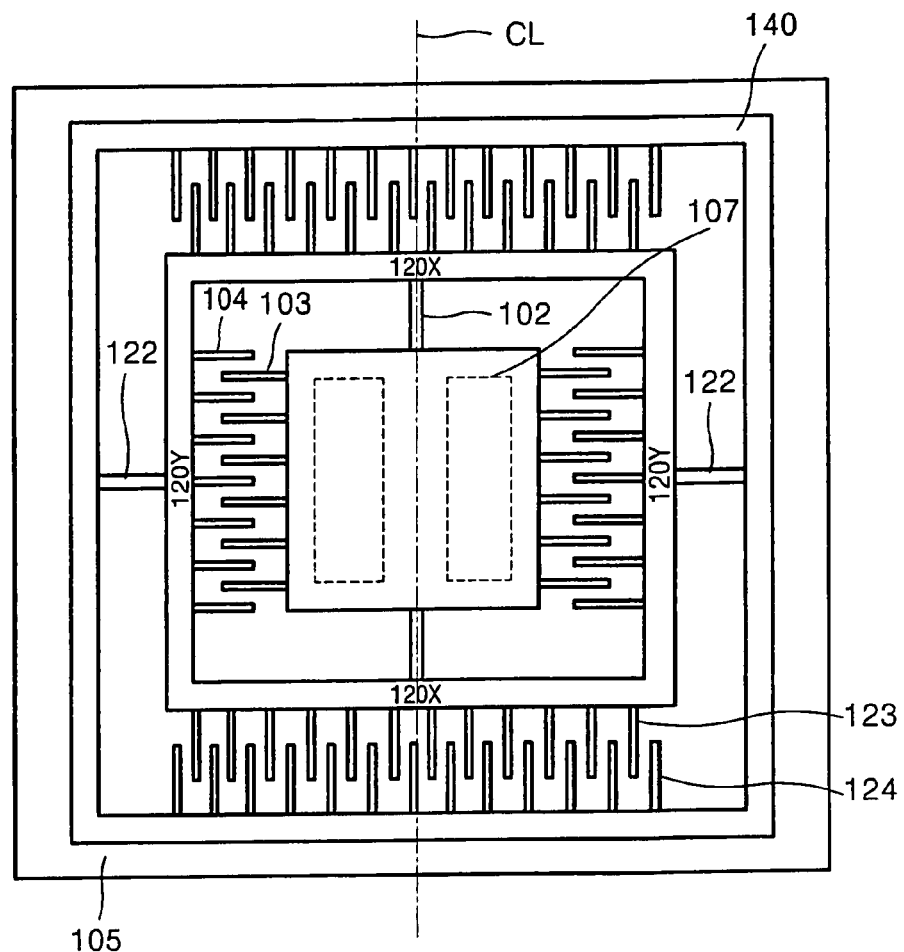
FIG. 17 is a plan view of an optical scanner according to a seventh embodiment of the present invention.

FIG. 17 is a plan view of an optical scanner according to a seventh embodiment of the present invention. Since the same reference numerals are used for the same constituent elements as those of the sixth embodiment, detailed descriptions thereof will be omitted herein.

Referring to FIG. 17, a rectangular fixed frame 140 supporting the second torsion spring 122 and the second fixed comb electrode 124 is arranged on the substrate 105. The second fixed comb electrode 124 is fixed to an inner side of the rectangular fixed frame 140 so as to be separated from the substrate 105.

Since the operation of the optical scanner according to the seventh embodiment is similar to the optical scanner according to the sixth embodiment, a detailed description thereof will be omitted herein.

Although in the above sixth and seventh embodiments only the flat panel type tuning electrode is described as the two-axis driving actuator, the above-described vertical driving comb electrode and fixed comb electrode for tuning can be installed instead of the flat panel tuning electrode.

As described above, since the optical scanner according to the present invention includes the tuning electrode which can tune the frequency of the optical scanner to the resonant frequency, the change in the resonant frequency due to a processing deviation can be easily corrected. Also, the angle of driving of the optical scanner can be increased by the resonant driving and the driving voltage of the stage can be reduced.

What is claimed is:

1. A two-axis driving optical scanner comprising:
   a substrate;
   a stage separated from the substrate to a predetermined height and driven in a first direction with respect to a center axis in a second direction perpendicular to the first direction;
   a first support portion including first torsion springs extending in the second direction from both sides of the stage and a rectangular motion frame having a pair of first portions parallel to each other and respectively connected to the first torsion springs and a pair of second portions parallel to each other and extending in the second direction;
   a stage driving portion including a plurality of first fixed comb electrodes and a plurality of first driving comb electrodes formed on inner sidewalls of the second portions and sides of the stage facing the inner sidewalls of the second portions, respectively, said stage driving portion being adapted to generate a seesaw motion of the stage in the first direction at a first frequency;
   a second support portion including second torsion springs extending in the first direction from the second portions and fixing the second torsion springs to the substrate;
   a motion frame driving portion including a plurality of second driving comb electrodes provided at outer sidewalls of the first portions and a plurality of second fixed comb electrodes fixed to correspond to the second driving comb electrodes to generate a seesaw motion of the motion frame in the second direction at a second frequency;

at least one driving comb electrode for tuning formed on a lower surface of the stage to a predetermined height in the second direction; and at least one fixed comb electrode for tuning formed on a surface of the substrate to a predetermined height to be alternate with the driving comb electrode for tuning.

2. The optical scanner as claimed in claim 1, wherein the second fixed comb electrodes are fixed on the substrate and alternately arranged between the second driving comb electrodes.

3. The optical scanner as claimed in claim 2, wherein the second fixed comb electrodes are vertically arranged on the substrate.

4. The optical scanner as claimed in claim 2, wherein the second support portion further comprises an anchor portion fixed on the substrate and separated in a predetermined from the second portion of the motion frame, and the second fixed comb electrodes are horizontally extended from the anchor portion.

5. The optical scanner as claimed in claim 1, wherein the second support portion comprises a rectangular frame which fixes the second comb electrodes and the second torsion springs therein.

* * * * *